Jan. 25, 1955 H. V. HEUSER 2,700,280
REFRIGERATING APPARATUS AND THAWING METHOD
Filed Aug. 18, 1949 5 Sheets-Sheet 1

Inventor
HENRY V. HEUSER
By Arthur Robert
Attorney

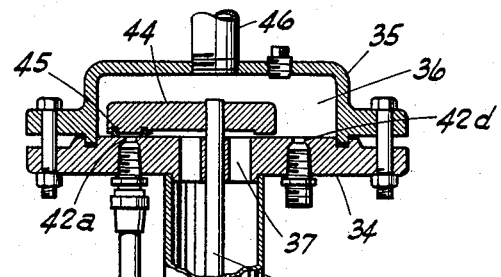
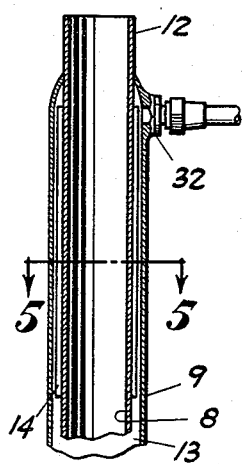
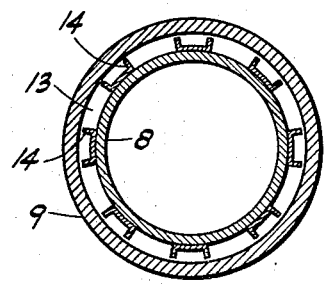
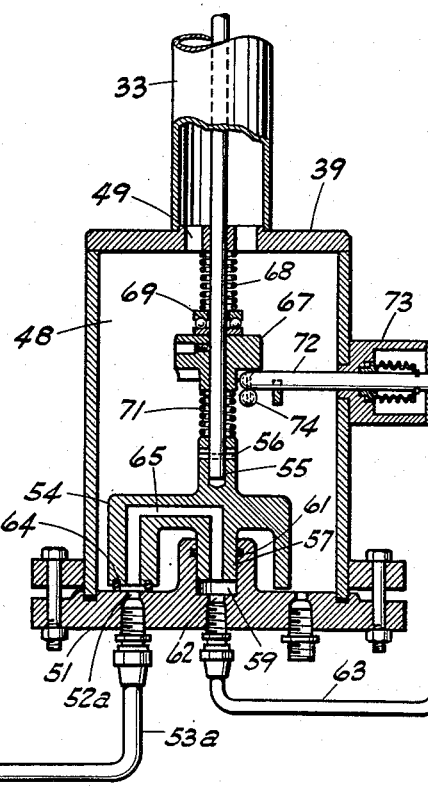
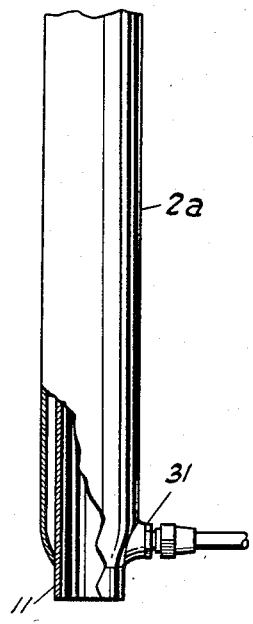

Inventor
HENRY V. HEUSER
By Arthur Robert
Attorney

Jan. 25, 1955     H. V. HEUSER     2,700,280
REFRIGERATING APPARATUS AND THAWING METHOD
Filed Aug. 18, 1949     5 Sheets-Sheet 4
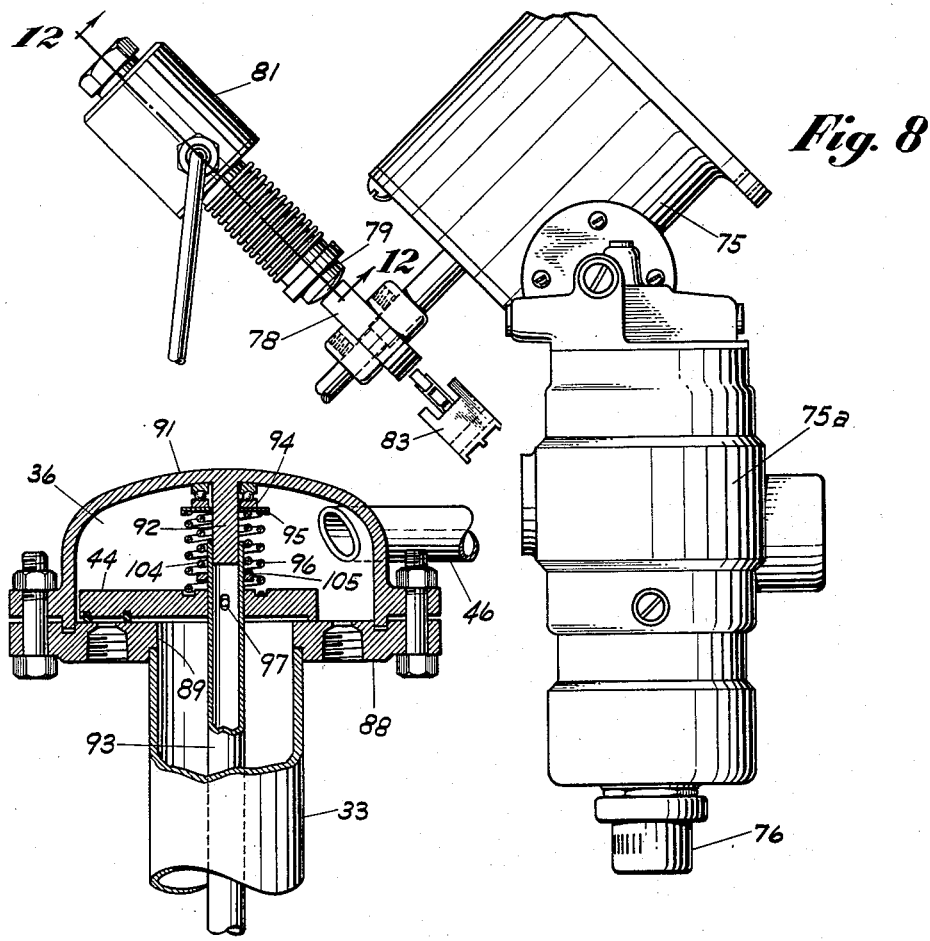
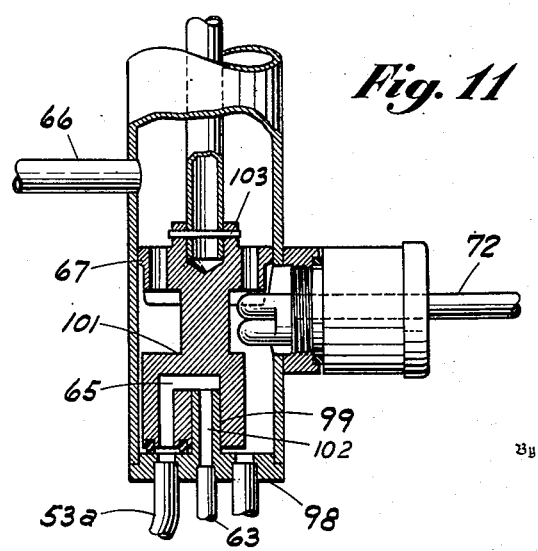
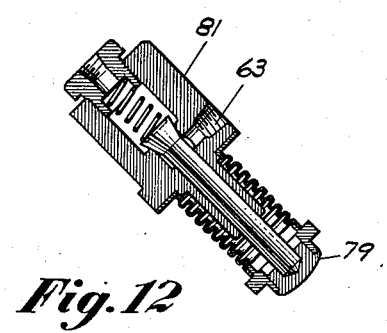
Inventor
HENRY V. HEUSER
By Arthur Robert
Attorney

United States Patent Office 2,700,280
Patented Jan. 25, 1955

2,700,280

REFRIGERATING APPARATUS AND THAWING METHOD

Henry Vogt Heuser, Louisville, Ky., assignor to Henry Vogt Machine Company, Louisville, Ky., a corporation of Kentucky Application August 18, 1949, Serial No. 111,047

12 Claims. (Cl. 62—106)

This invention relates to a refrigerating machine for congealing liquids into rods, cylinders, or other forms. The invention may be employed for forming ice from water, in which connection it will be described, but the invention is not limited to such use.

In one type of ice making machine for producing ice in the form of tubes or rods, as heretofore constructed, during the thawing cycle warm refrigerant gas is introduced into the top of the evaporator to expel the liquid refrigerant through an exit at the bottom after which a valve closes in the exit to prevent the gas escaping therethrough. The sensible and latent heat from the warm gaseous refrigerant introduced into the evaporator and kept under pressure therein thaws loose the ice rods. The warm refrigerant gas for thawing is introduced at the top, which is the warmest part of the evaporator, and thus the thawing takes place from the warmest part at the top toward the coldest part of the bottom. The ice rods cannot be released until the bottoms are thawed loose, and as the upper ends of the rods are thawed loose first, continued application of heat to the upper ends results in excessive melting of the ice. Furthermore, as the freezing action in the evaporator extends for some distance downward along the tubes, it is necessary in such machines to provide an additional chamber for warming the lower ends of the tubes in order to cut down the total thawing time and reduce melting of the ice.

It has also been proposed to construct machines in which the evaporator chamber is of relatively small cross sectional area formed by a coil of relatively small diameter wound about or embracing the ice tubes, to contain liquid refrigerant during the freezing cycle. At the end of the freezing cycle the evaporator coil contains liquid refrigerant, and when gaseous refrigerant is introduced at the bottom of the evaporator coil during the thawing cycle the pressure in the liquid and gaseous phases of the system become equalized at some intermediate pressure and the gaseous refrigerant blows out or boils off the residual liquefied refrigerant in the coil by the end of the thawing cycle. Thus, at the beginning of the next freezing cycle little or no liquid refrigerant remains in the evaporator. Furthermore, in this construction the liquid refrigerant is not in direct or wetting contact with the ice tube wall, so that heat transfer is accomplished through a double wall structure, with a corresponding decrease in efficiency of heat transfer during both the freezing and thawing cycles.

It is an object of the present invention to provide an improved operation of ice making machines operating on alternate freezing and thawing cycles by providing a substantial quantity of liquid refrigerant in the evaporator at the commencement of the freezing cycle.

Another object is the provision of an efficient tube ice machine of simple construction having an increased ice making capacity.

Another object is the provision of a tube ice machine of simple construction for producing ice rods or fragments in a substantially continuous manner.

Another object is to operate an ice making machine so as to carry out the thawing cycle in the presence of a substantial quantity of liquid refrigerant in the evaporator, so that the freezing cycle starts with the residual refrigerant therein.

Still another object is the provision of an efficient tube ice machine in which the compressor is maintained in operation continuously at substantially its full capacity during the freezing and thawing phases.

According to one feature of the present invention, the thawing operation is carried out by trapping whatever liquefied refrigerant is present in the evaporator at the end of the freezing cycle, and passing warm refrigerant gas into this residual liquefied refrigerant in the evaporator, where it is maintained under pressure. As the evaporator is now a closed vessel or chamber, the pressure builds up in the evaporator to the gas pressure so that evaporation of liquid refrigerant is prevented, and the sensible and latent heat of the refrigerant gas warms the liquefied refrigerant and thaws loose the ice rods from the bottom towards the top, whereupon the ice rods may drop through the open bottoms of the tubes.

Where the evaporation chamber has a relatively large cross sectional area so that the introduction of hot gas is not apt to blow out the liquid refrigerant, the thawing step may be modified by holding whatever liquefied refrigerant is present in the evaporator at the end of the freezing cycle, and equalizing the pressure in the liquid and gaseous phases of the system at some suitable value, which provides a gas temperature above freezing, and passing warm refrigerant gas into the liquid refrigerant in the evaporator. By operating in this way, the heat from the warm gaseous refrigerant thaws the ice loose, from the bottom up and at the end of the thawing cycle a substantial quantity of liquid refrigerant remains in the evaporator to commence the next freezing cycle.

By carrying out the thawing operation in this manner, a number of beneficial results are obtained. One result is that the ice making capacity of a machine can be increased. At present, the reasons for this increase in capacity are not fully understood. It may be that the increased ice production is accounted for by elimination of excessive melting of the ice rods during the thawing cycle. Another possible explanation is that at the end of the thawing cycle, a relatively large volume of liquid refrigerant is present in the evaporator which evaporates vigorously during the following freezing cycle and promotes rapid cooling or freezing. Because the freezing cycle starts with a large volume of liquid refrigerant in the evaporator, more rapid heat transfer may occur during the freezing cycle. Or the increased ice production may be due in part to both these conditions, or to other reasons not fully appreciated at the present time.

Other benefits are obtained in the practice of the invention. The time lag required to empty the evaporator of liquid refrigerant, and to refill the evaporator with liquid refrigerant at the end of the freezing and thawing cycles respectively, is eliminated. Also, the presence of the cold liquid refrigerant in the evaporator chamber at the beginning of the thawing operation acts as a modulator to prevent too rapid thawing of the ice rods, and thus prevents checking or cracking of the ice surface, which causes cloudiness. In a batch type machine, a simplification of the apparatus may be accomplished so that a single valve for controlling the cycle may replace the four valves heretofore employed, and the apparatus may be operated by the reverse cycle process with elimination of a standby receiver or reservoir. In such apparatus equipped with a bottom heating chamber and operating by the reverse cycle process, the warm liquid or gaseous refrigerant may be conducted to the evaporator chamber by way of the heating chamber, to avoid introducing extraneous heat into the system. The invention is of particular application to a battery of freezers operated in a progressive series to provide substantially continuous production of ice. In such application a plurality of evaporators, of any desired construction, are operated so that each passes progressively through its respective freezing and thawing cycles, and each evaporator in effect is isolated at the beginning of its thawing cycle from the other evaporators of the system, by closing off its suction and liquid supply connections, and introducing warm gaseous refrigerant under pressure into the liquid refrigerant remaining in the isolated evaporator.

In one practical embodiment liquid refrigerant is supplied to the evaporators, from a common supply chamber which receives liquid refrigerant from the condenser through a suitable pressure differential maintaining device, such as, a temperature controlled valve, float valve, capillary tube, or any other of a number of known devices suitable for this purpose. If desired, suction may be applied to the liquid in the common supply chamber to balance the pressure on the liquid body therein, so that liquid refrigerant flows to the freezer units by gravity. The quantity of liquid refrigerant supplied to each freezer unit thus is automatically controlled by the liquid head in the supply chamber and the rate of vaporization in the freezer.

Liquid refrigerant and warm gaseous refrigerant are supplied to the evaporators in the proper sequence by intermittently advanced distributor devices located between the common supply chamber and the evaporators, and driven by a continuously operating motor. This may be a constant speed motor operating through an adjustable speed reducer, or may be a constant ratio reduction gearing operated by a variable speed motor. The need for complicated cycle timers, electric relays and the like thereby is obviated. A valve in the warm gas line may be operated in conjunction with said distributor valves, preferably by a common motor, the gas valve serving to cut off the gas supply while the distributor valves are changing positions.

As the compressor is at all times receiving vapors from the units undergoing their respective freezing cycles, the compressor operates at substantially full capacity. The heat for thawing the evaporator undergoing its thawing cycle is obtained from the water in those evaporators undergoing the freezing cycle. This enables the use of a smaller compressor as compared to a batch system having the same number of evaporators, or enables a greater freezing capacity to be utilized with a given size of compressor. The number of evaporators which may be employed in this arrangement depends on the thawing and freezing times, the maximum number being determined by dividing the thawing time into the freezing time and adding one. This may be expressed by the formula $$\text{Maximum number of evaporators} = \frac{\text{freezing time}}{\text{thawing time}} + 1$$

By arranging the evaporators about a common center, a single cutter serves to break or cut the ice rods as they are released successively from the various ice tubes. Because a substantially continuous discharge of ice rods is effected with the proper number of evaporators, a smaller size cutter motor may be employed and a steady uniform supply of ice rods or tubes may be obtained. This construction enables the water pump as well as the cutter to be operated continuously, so that if desired they may be operated from a single motor.

In the preferred progressive machine structure each freezer unit is a single ice tube surrounded by a jacket to provide an evaporator and thawing chamber proportioned with a small cross sectional area to provide a large heat exchange surface for the volume of liquid refrigerant therein. In such a freezer unit, or the conventional unit comprising a small diameter coil wound about the ice tube, the thawing operation can be carried out by passing warm refrigerant gas through the trapped liquid refrigerant without the time delay incidental to blowing out or removing the liquid refrigerant from the small area evaporator chamber. Further advantages of the preferred form of evaporator are that efficient heat transfer is promoted because the liquid refrigerant is in direct or wetting contact with the ice tube wall, the rapid flow of refrigerant is promoted by the small cross sectional area and rapid evaporation. The heat conduction may be increased at selected zones or areas by the provision of conducting fins secured to the ice tube at such selected zones. The ice tubes may extend below the jacket for a sufficient distance to prevent ice formation at the lower ends of the tubes, and the introduction of the heated gaseous refrigerant at the lower ends of the jacket allows ample time for heat transfer downwardly along the ice tube exterior of the jacket to thaw the ice exterior of the physical confines of the jacket while the upper part of the ice tube is thawing. The provision of a separate thawing chamber at the bottom of the tube thus is obviated.

The invention will be described in greater detail in connection with the accompanying drawings illustrating preferred embodiments of the invention by way of example, and wherein:

Figure 3 is an end view of a detail,

Figure 10:
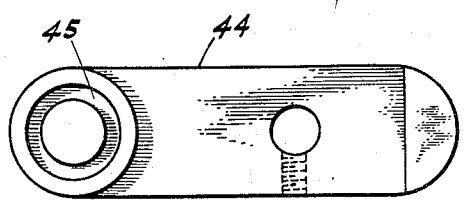
Figure 9:
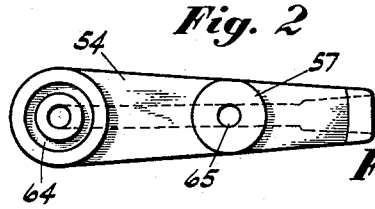
Figure 6:
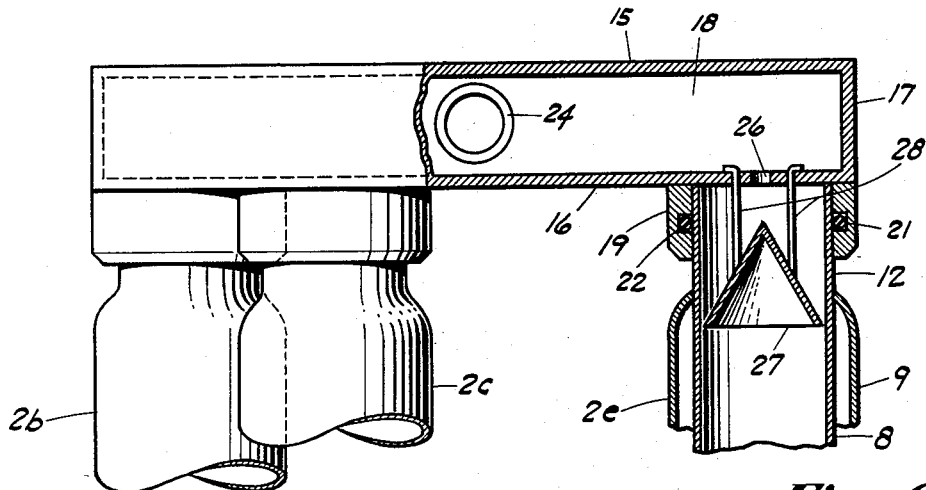
Figure 7:
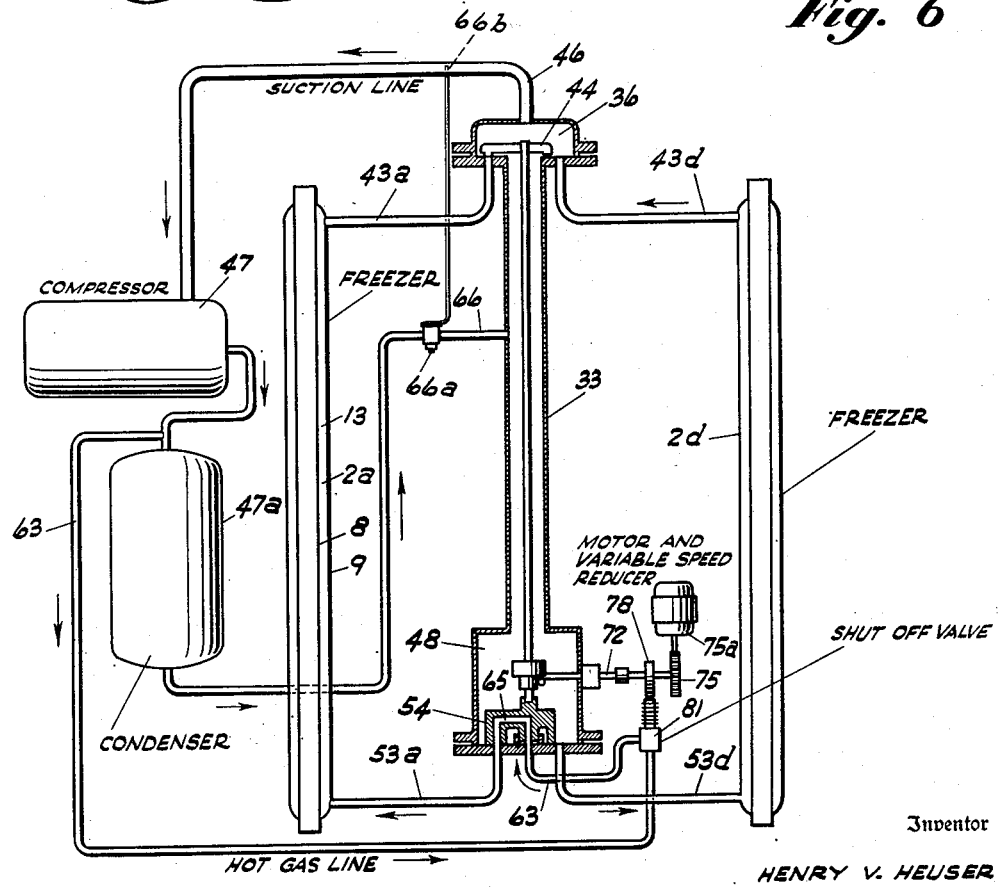
Figure 13:
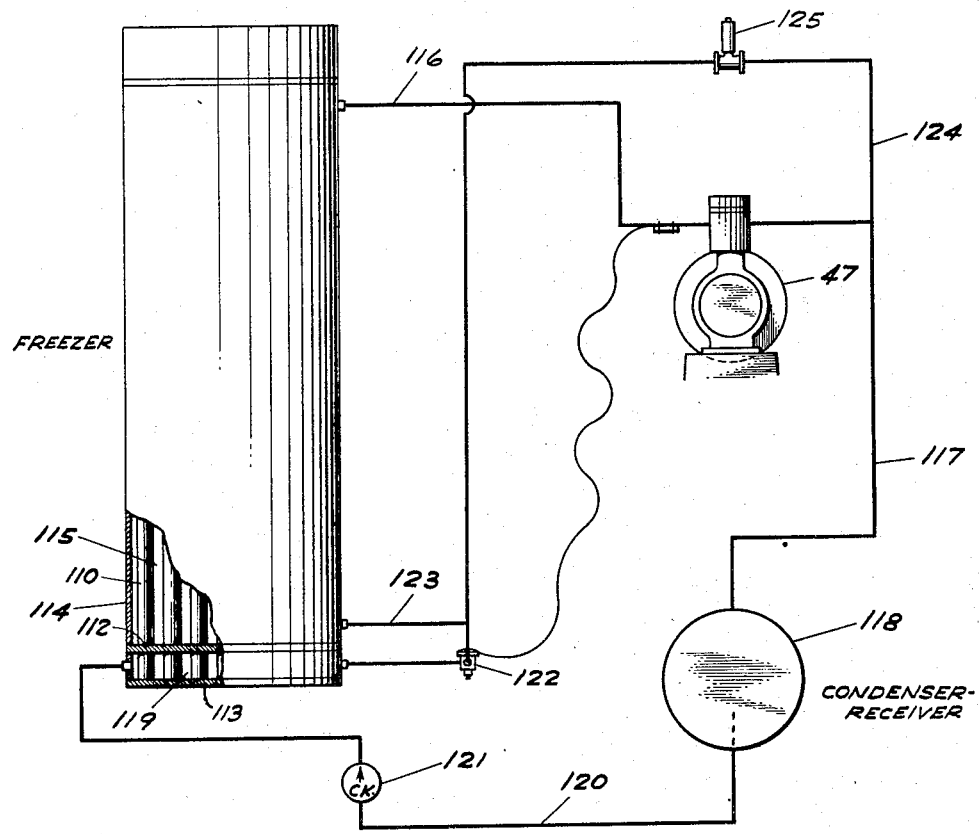

Figure 4 is a view with parts in section of the control apparatus and a freezer unit, Figure 5 is a section taken on line 5—5 of Figure 4, Figure 6 is a view partly in section of a water distributor, Figure 7 is a schematic view illustrating the principle of operation of the invention, Figure 8 is a plan view of the cycle control motor drive and cooperating parts, Figures 9 and 10 are bottom views of parts of the cycle control valves, Figure 11 is a view partly in section of a modification, Figure 12 is a view in section of the warm gas valve, and Figure 13 is a schematic view partly in section of a modification.

Referring to the drawing, the apparatus comprises a cabinet or housing 1 having a lower or base portion 1a which encloses a cutter 1c, a grille or screen 1d, and water tank 1e. The upper part 1b encloses the cutter motor 1f, and a plurality of freezer units 2a, 2b, etc.—2f arranged about a water distributor head 7. Any desired number of freezer units may be employed, six such units being shown, which are alike, so that only one will be described in detail. Unit 2a comprises an ice tube 8 (Figure 4) surrounded by a jacket 9 which is necked down at the ends, and is fastened to the ice tube by welding, brazing or in any other desired manner to produce a pressure tight fit. Each ice tube has a portion 11 extending below the end of its jacket and a portion 12 extending above the end of the jacket. It is preferred to have jacket 9 of only slightly larger diameter than tube 8 so as to provide a relatively close or narrow annular chamber 13 therebetween to serve as an evaporator or freezer chamber. The outer wall of jacket 9 may be covered with a suitable heat insulator. If desired, fins 14 may be secured to the upper end of tube 8 for a purpose to be later described.

The water distributor head 7 is made up of a circular top plate 15 (Figure 6), a similar bottom plate 16 and a cylindrical wall 17 to provide a distribution chamber 18. The bottom wall carries a plurality of sleeves 19 of a depth slightly less than the exposed upper end 12 of the ice tube, and of an internal diameter to receive the end with a sliding fit. A recess 21 is formed in the internal wall of each sleeve 19 and contains a gasket 22 of synthetic rubber composition or other suitable resilient material. The distributor head is assembled to the ice tubes by forcing it over the tube ends, with the ends 12 received in sleeves 19, the compression of the gaskets 22 being sufficient to firmly hold the distributor head and tubes assembled. Water is supplied to the distributor head by a connection or nipple 24 connected by suitable piping to a water pump (not shown) which receives water from tank 1e.

Figure 1:
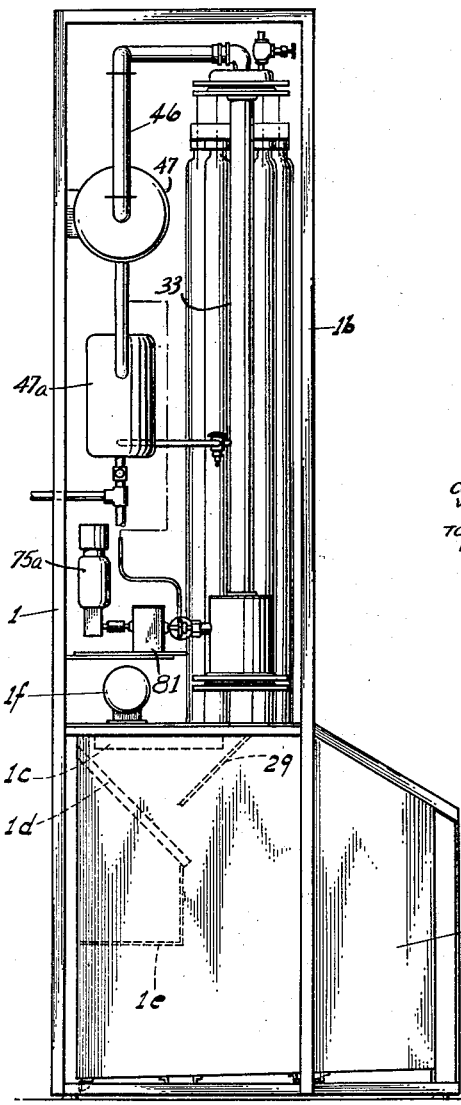
Figure 1 is a side view of an embodiment.

The bottom plate 16 of the water distributor has a plurality of orifices 26 located to register with the respective ice tubes 8. A spreader 27 is suspended by brackets 28 from the bottom plate 16 to transfer the water to the sides of the ice tubes. The water flows down the interior walls of the ice tubes in a thin film, and excess water which does not become frozen thereto, is discharged at the bottom end 11 onto deflector plate 29 (Figure 1) which deflects the water through screen 1d into the water tank 1e. The water in tank 1e is replenished from any suitable source, through a float control valve (not shown) or the like. By having the tube 8 extend below the jacket at 11, Fig. 4, the freezing temperature in the jacket does not extend the full length of extension 11, and thus ice formation at the lower open end of the tube is prevented or retarded.

Each jacket 9 has a connection 31 at the bottom through which liquefied refrigerant is supplied to the evaporator chamber 13 during the freezing cycle. This same connection also serves to supply hot gaseous refrigerant to the chamber 13 during the thawing cycle as will hereinafter appear. A connection 32 at the top communicates with the suction side of a compressor as will later be explained. The freezer units are positioned adjacent to a distributor column 33 which now will be described.

At the top, the column 33 has a flange or valve plate 34 (Figure 4) secured thereto, and a cover plate 35 secured to plate 34 provides a suction chamber 36. Openings 37 surrounding a central bearing in the valve plate provide communication between the suction chamber and the interior of the column 33, and a shaft 38 journalled in the central bearing of the plate extends through the column and through a bearing in plate 39 secured to the bottom of the column. The valve plate 34 has a plurality of ports 42a, 42b, etc.–42f, which communicate by suitable conduits 43a, 43b, etc. with the connections 32 of the respective freezer units 2a, 2b, etc. A selector valve member 44 (Figures 4 and 10) is secured on shaft 38 to rotate therewith and has an annular insert 45 of resilient material serving to seal off each port 42a, etc. with which it comes into registry, from the suction chamber 36. A conduit 46 connects the suction chamber to the intake side of a compressor 47 (Fig. 7) and the compressor discharges to a condenser 47a. Thus, all ports 42a, etc. are open to chamber 36 to communicate suction to the evaporator chambers 13 of the respective units 2a, 2b, etc. except the one port covered by the selector valve member 44. In Figure 4, port 42a is shown closed, and thus the chamber 13 of unit 2a is disconnected from suction chamber 36. As the valve member 44 rotates to index the various chambers 13 of units 2b, 2c, etc., they are progressively cut off from the suction chamber 36.

The liquid supply chamber 48 at the bottom communicates with the column 33 through openings 49 in the plate 39. The opposite wall 51 of the chamber has distribution ports 52a, 52b, 52c–52f which communicate by conduits 53a, 53b, etc. to the respective bottom connections 31 of the freezer units 2a, 2b, etc. A gas distributing valve 54 has a socket 55 receiving the lower end of shaft 38, and a pin 56 passing through a slot in the valve member secures these parts together so as to allow axial lost motion between them. This facilitates manufacture and enables the valve members 44 and 54 to seat independently. A guide boss 57 on the lower face of the valve member is journaled in a socket or bearing 59 in the valve plate 51, and an annular resilient packing 61 therein seals off the gas inlet port 62 from the liquid distribution chamber 48. A conduit 63 leading from the compressor outlet conducts hot gaseous refrigerant to port 62 direct from the compressor.

The bottom of the valve member 54 carries an annular resilient insert 64 and a passage 65 through the valve connects the gas inlet port 62 with the respective ports 52a, etc. as the valve is indexed in its various positions. The valves 44 and 54 advance in unison and are synchronized so that when valve 44 shuts off the upper end of a freezer unit from suction compartment 36, valve 54 brings passageway 65 into registration with a port leading to the bottom of that freezer unit. Thus, at substantially the same time that the evaporator chamber of a unit is sealed or isolated from communication with the suction chamber, hot gaseous refrigerant is supplied to the bottom of the evaporator chamber of that unit, while the evaporator chambers of all the other units continue to be supplied with liquefied refrigerant from chamber 48 through the respective uncovered ports 52b, etc., and suction is applied at the tops of said units.

Figure 2:
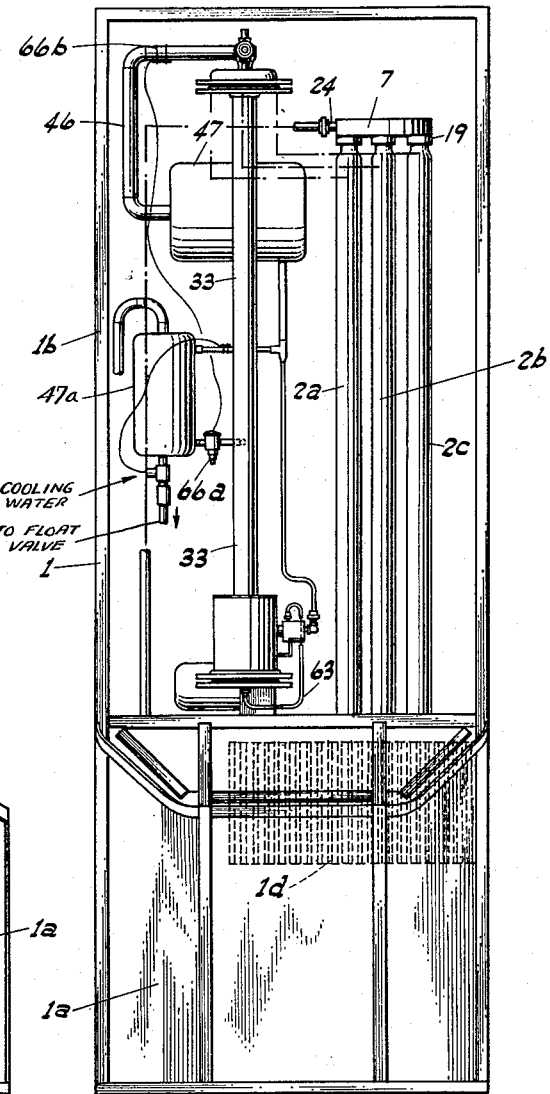
Figure 2 is a front view as seen from the right of Figure 1.

The liquid refrigerant is supplied to the column 33 through a connection 66 adjacent to the top so that the head of liquid refrigerant in the column controls the liquid level in the evaporator chambers 13 of the various units. The admission of liquid refrigerant to column 33 is controlled by a temperature controlled expansion valve 66a (Figures 2 and 7) in the feed connection 66, and a temperature responsive element 66b in the common suction line 46 controls the operation of valve 66a.

Because of the small cross sectional area of the space 13 between the jacket 9 and tube 8, the liquid refrigerant presents a large heat exchange area to the tube 8 relative to the column of liquid in the evaporator chamber, and vigorous vaporization or boiling occurs in the evaporator chamber during the freezing cycle. The upper surface of the liquid in column 33 is in communication with the suction chamber 36, so that the pressure therein and in the chambers 13 is equalized. The level of liquid refrigerant maintained in column 33 depends on the temperature of the gas in the suction line 46, and the level of refrigerant in each chamber 13 is determined by the apparent density of the boiling gas and liquid mixture therein. As column 33 is insulated only a small amount of evaporation occurs therefrom, this evaporation serving to reduce the temperature of the liquefied refrigerant stored therein. The level of liquid refrigerant in chamber 13 may overlap or lie below the bottoms of fins 14. The fins may be employed to increase the conduction of heat away from the ice tube at its upper end so as to reduce the formation of a hollow cone or crater in the upper end of the ice rod. However, it is to be understood that these fins may be omitted, if it is so desired.

A crown gear 67 is carried on shaft 38 in chamber 48, and a helical spring 68 interposed between plate 39 and a thrust bearing 69 on the crown gear, serves to resiliently maintain the valve 44 in sealing contact with the valve plate 34. A spring 71 interposed between the hub of the crown gear and valve 54 keeps the gas valve 54 seated on plate 51. A transverse shaft 72 extending through a suitable stuffing box 73 into the liquid distribution chamber carries a pawl tooth 74 adapted to mesh with the teeth of the crown gear. Shaft 72 is rotated at a suitable slow rate of speed by a reducing gear box 75, driven by motor 75a (Figure 8), which preferably embodies a built-in variable speed feature adjusted by dial 76. This enables the speed of the shaft 72 to be adjusted as required. Each time the pawl tooth 74 is brought into engagement with the crown gear it raises the crown gear and shaft 38, thus first lifting valve 44 off its seat, and then lifting valve 54 off its seat, this sequence of movement being provided by the lost motion in the pin and slot connection 56. Both valves 44 and 54 then are advanced one tooth to cover the next adjacent ports 42b and 52b respectively, whereupon the pawl becomes disengaged. At substantially the same time, or slightly in advance of this lifting action, a cam 78 (Figure 4) on shaft 72 releases the operating plunger 79 of a valve 81 in gas line 63 to close this line. By first lifting valve 44 the pressure in chamber 13 is relieved, so that upon lifting of valve 54, gas does not blow back into liquid distributing chamber 48. The lifting of valves 44 and 54 also decreases wear on the sealing surface, as these surfaces do not drag or rub in rotation of the valve. However, the lifting of the valves is optional, and the escape of a small amount of gas into chamber 48 has no serious disadvantage, as chamber 48 is vented to suction chamber 36.

A switch 83 (Figure 8) operated by cam 78 on the shaft 72 may be provided to control the operation of the cutter motor 1f. The closing of this switch, following the opening of valve 81 energizes the cutter motor, so that when the ice rod is thawed loose and falls out of the tube 8 it is cut into suitable lengths by the cutter. The pieces of ice drop on the grille 1d which allows water and chips to fall through, and the pieces then drop into the storage bin in the base 1a. When cam 78 opens switch 83 it deenergizes the cutter motor. It will be understood that the cutter motor may be operated continuously, in which case the switch 83 may be omitted.

The operation of the invention now will be described with particular reference to Figure 4 and the diagrammatic illustration in Figure 7. It will be assumed that the apparatus has been operating long enough so that freezer 2a is ready to start the thawing cycle. Under such conditions the chamber 13 contains liquid refrigerant to about the level of liquid refrigerant in column 33, and tube 8 contains a rod or hollow cylinder of ice, depending on the duration of the freezing cycle. Motor 75a is operating continuously. Assuming valve 81 is open, shaft 72 rotates to the position where cam 78 allows valve 81 to close, in which position dog 74 is just about ready to engage crown gear 67. Thereafter dog 74 engages gear 67 with a rotary lifting action. The lifting motion raises gear 67 and shaft 38, thus lifting valve 44 first, then lifting valve 54, and valves 44, 54 are moved to the position shown in Figure 7, whereupon they are restored to their seats. By this time cam 78 has turned to the position to open valve 81.

In this position port 42a is sealed by valve 44 so that suction is no longer applied to chamber 13 of unit 2a, and warm gaseous refrigerant is flowing direct from the compressor 47 through conduit 63, port 62, valve passage 65, port 52a and conduit 53a into chamber 13 of unit 2a. This gas warms the residual liquid refrigerant, and as the pressure builds up in chamber 13 the transfer of heat from the gas causes condensation of some of the gas.

The compressor is supplied with gas from the five units in various stages of the freezing cycle, and heat for warming the liquid refrigerant in the unit undergoing thawing is supplied from the compressed gaseous refrigerant, which was heated by compression, so that no extraneous heat flows into the system. The heating action continues in the evaporator until the ice rod in tube 8 is thawed loose. Switch 83 in the meantime has started the cutter motor 1f, and the ice rod which drops from tube 8 is cut into the desired lengths by the cutter. The ice pieces drop onto inclined screen 1d which allows chips and undersized pieces to fall through into the water tank, and the large pieces slide off into the storage bin. The flow of water to tube 8 in unit 2a from distributor 7 is not stopped during the thawing cycle, but the flow of water is automatically throttled by the size of the orifice 26.

By this time, the continuously operating motor 75a has shut off the cutter motor, cam 78 has moved around to allow valve 81 to close, then valve 44 is again lifted to open port 42a and allow the escape into suction chamber 36 of gas trapped under pressure in chamber 13 of unit 2a. Thereafter valve 54 is lifted, and valves 44, 54 are turned to uncover ports 42a, 52a respectively and close ports 42b, 52b respectively leading to freezer unit 2b. With the cutting off of valve 81 and opening of port 42a vaporization of liquid refrigeration in unit 2a begins and the freezing cycle therein is thus initiated, while the thawing cycle in unit 2b is initiated and proceeds as described in connection with unit 2a. Thus, throughout operation the units pass progressively through alternate freezing and thawing cycles.

The level or quantity of liquid refrigerant in the evaporation chambers in the various units is controlled partly by the level of liquid refrigerant in column 33, which in turn is controlled by thermostatic valve 66a in conduit 66 leading from the condenser. The temperature responsive element 66b in the suction line 46 is set to open valve 66a at a temperature a few degrees above the boiling point of the refrigerant—that is—at a few degrees of superheat of the vapor. As element 66b is in the common suction line 46 of all the freezer units, it will respond to average conditions. This average is only temporarily modified by the progressive advancement to the thawing cycle of the freezer units, one at a time, and because of the reserve supply of liquid refrigerant in column 33, the units in their freezing cycle receive an ample supply of liquid refrigerant. The need for a separate or standby receiver thus is obviated.

At the beginning of the thawing cycle the quantity of refrigerant in the evaporator undergoing thawing is probably nearly at a maximum, and this quantity is augmented by the condensation of the gas introduced during the thawing cycle. Thus, at the beginning of the next freezing cycle there is a large volume of liquid refrigerant in the evaporator so that vaporization is vigorous enough to carry away heat from the refrigerant faster than heat can be supplied thereto from the water. This causes a rapid reduction in temperature of the liquid refrigerant, and as the rate of heat transfer from the water is a function of the temperature difference, the water is frozen at an accelerated rate, and results in an increased production of ice.

In the modified distributor shown in Figure 11 the column 33 has a top valve plate 88 with an opening 89 therein connecting suction chamber 36 with the interior of the column. Cover 91 has a stub 92 in which hollow shaft 93 is journaled. An antifriction bearing 94 and washer 95 carried on the stub takes the thrust of spring 96 interposed between the valve 44 and the cover to hold the valve 44 yieldingly on its seat, shaft 93 being secured to valve 44 by a pin and slot connection 97. The bottom of column 33 is closed by a valve plate 98 providing a stub 99 upon which the lower valve member 101 is journaled, and the passage 102 extends through the boss to connect with passage 65. The lower valve member 101 embodies an integral crown gear 67 bored to allow passage of liquid, and is secured to shaft 93 by a pin 103. Spring 104 at the top is interposed between a flange 105 on the shaft and the washer 95 for holding valve 101 on its seat. The valves 44 and 101 may be kept on their respective seats by any other type of seating arrangement.

For example, springs 96 and 104 may be replaced by a bellows chamber connected to conduit 63 downstream of valve 81. This provides seating pressure on the valves during the period that the valves are not rotating, and relieves the pressure when the valves are changing position.

The modification shown in Figure 13 illustrates the application of the invention to a batch type freezer of a known construction. The freezer is of the type having water tubes 110 extending into headers 112 and 113 and surrounded by a jacket 114 to provide a common evaporator chamber 115 of relatively large cross-sectional area. The vapors evolved from the evaporator chamber 115 during the freezing cycle pass by conduit 116 to the compressor 47, and the heated compressed vapors then pass by conduit 117 to the condenser-receiver 118. The lower ends of the tubes 110 pass into a supplemental warming chamber 119. The liquid refrigerant flows from the condenser-receiver 118 by conduit 120 through a check valve 121 to warming chamber 119 and thence through a thermostat controlled valve 122 by conduit 123 into the bottom of the evaporator chamber 115. Conduit 120 may extend into receiver 118 to form a standpipe, as shown by the dotted line. The thermostat controlled valve is connected to be operated by the temperature of the gas sucked from the evaporator through conduit 116 and opens when the temperature of the gas rises above a set degree. The outlet side of the compressor is connected by a conduit 124 having a solenoid controlled valve 125 therein to the outlet side of the valve 122 for directing warm gas into the evaporator.

During the freezing cycle suction is applied to the evaporator through conduit 116, and when valve 122 is open, liquid refrigerant is supplied to the evaporator from the condenser-receiver through conduit 120, chamber 119, valve 122 and conduit 123. The warm liquid refrigerant flowing through chamber 119 prevents freezing in the lower ends of tubes 110. At the end of the freezing cycle valve 125 is opened to admit warm gaseous refrigerant to the bottom of the evaporator. The outlet side of the compressor thus becomes connected to its inlet side through chamber 115 so that the pressure in the liquid and gaseous phases of the system become equalized at some value high enough to keep the gas at a temperature above the freezing point of water. Even though valve 122 may be open in the thawing phase, the check valve 121 prevents reverse flow of refrigerant through conduit 120 into receiver 118. The heat of the gas introduced to the evaporator through the liquid refrigerant therein heats the liquid refrigerant remaining in the evaporator and thaws loose the ice rods. Because of the large cross sectional areas of the evaporator chamber the liquid refrigerant cannot be blown out by the incoming gas. After the thawing operation a substantial quantity of liquid refrigerant remains in the evaporator for starting the next freezing cycle. At the end of the thawing cycle valve 125 closes to cut off entrance of gas to the evaporator and as suction now is applied to the evaporator, vaporization takes place therein rapidly. At the same time pressure builds up on the outlet side of the compressor and in the condenser.

The advantages residing in the invention may be summarized as follows: The compressor may be continuously operated at substantially maximum capacity resulting in greater efficiency; the cross sectional area of the evaporator chamber may be reduced to obtain a high rate of heat transfer, thus promoting rapid evaporation of refrigerant and rapid flow of refrigerant through the chamber; direct or wetting contact of the liquid refrigerant is accomplished in a small area evaporator chamber; the haitus between the thawing operation and the freezing operation, because of the delay incidental to removing liquid refrigerant at the end of the freezing cycle and returning liquid refrigerant at the beginning of the freezing cycle is obviated; immediate commencement of the freezing cycle with a full capacity of liquid refrigerant in the evaporator chamber upon return of suction pressure in the evaporator is accomplished; thawing time is reduced; ice rods or fragments may be produced at a continuous rate substantially as required, thereby reducing waste of ice by melting in storage; and the apparatus is simplified and its cost of manufacture reduced.

I claim as my invention:
1. The method of cyclically operating a refrigerator chamber having a wall contacted on one side by a body of liquid refrigerant and on the other side by a liquid to be frozen which comprises: supplying liquefied refrigerant to said chamber and applying suction to the refrigerant in said chamber to draw off vapors until a mass of solidified liquid is formed; then passing warm gaseous refrigerant into the body of liquid refrigerant to warm said body in said chamber and closing off escape of gas and liquid from said chamber to allow building up the pressure in said chamber, whereby the heat from the gaseous refrigerant is transmitted to the liquid refrigerant and thaws loose said mass of solidified liquid.

2. A freezer machine comprising: a plurality of freezer units arranged for operation alternately on a freezing cycle and thawing cycle; rotary valve means for controlling admission of liquid refrigerant and warm gaseous refrigerant to said units during their respective cycles of operation; intermittent drive means for said valve means; a continuously operated electric motor for operating said drive means; and means for varying the operating period of said intermittent drive means to vary the cycle periods.

3. In a freezing machine, a plurality of freezer units arranged about a common axis; means for supplying liquid refrigerant to said units and means for applying suction to said units during the freezing cycle; means for progressively supplying hot gaseous refrigerant to said units during their respective thawing cycles; a shut off valve for gaseous refrigerant; a cutter unit below said freezer units; electrical switch means for actuating said cutter unit; and cam means engaging and moving said valve and switch.

4. A refrigerating apparatus comprising: a water distributor housing forming a water distributing chamber, said housing having a plurality of circumferentially grooved tube sockets and water distributing openings extending into said sockets; resilient gaskets in said sockets, open end water freezing tubes extending into said sockets and frictionally sealed by said gaskets; and evaporating chambers around said tubes.

5. In a refrigerating machine comprising a plurality of evaporator chambers in heat exchange relation with liquid to be frozen: a distributor chamber for containing liquid refrigerant providing a common suction distributing chamber adjacent the top thereof; conduit means connected between said evaporator chambers and suction distributing chamber; rotary valve means adjacent the top of said distributor chamber controlling said conduits to progressively cut off suction to said evaporators in sequence while maintaining suction in said distributor chamber; conduits connected adjacent the bottom of said distributor chamber to said evaporator chambers for supplying liquid refrigerant to said evaporator chambers; a second rotary valve means operatively connected to said first valve means controlling said latter conduits for progressively cutting off the supply of liquid refrigerant to said evaporator chambers; and hot gaseous supply means connected to said latter valve means for progressively supplying hot gaseous refrigerant to the evaporator chambers when the supply of liquid refrigerant is cut off therefrom.

6. In a refrigerating machine comprising a plurality of evaporator chambers, each having an inclosure for receiving liquid to be frozen: a distributor chamber for containing liquid refrigerant; a valve member adjacent the top of said distributor chamber providing a circular series of openings; conduit means connecting said openings to the tops of said respective evaporator chambers; a rotary valve closure member for closing one of said openings; a second valve member adjacent the bottom of said distributor chamber having a circular series of openings; conduit means connecting said latter openings to the respective bottoms of said evaporator chambers; a rotary valve distributor member cooperating with said second series of openings; means for supplying hot gaseous refrigerant to said valve distributor member whereby the gaseous refrigerant is conducted to one of said evaporator chambers; means for intermittently rotating said valve closure member and distributor member in synchronism to progressively cut off suction and liquid supply to said evaporator chambers in sequence and to supply hot gaseous refrigerant under pressure to an evaporator chamber while so cut off; and valve means in the hot gaseous refrigerant supply means for shutting off the flow of hot gaseous refrigerant to said distributor during rotation thereof.

7. In a freezing machine: an evaporating chamber; an enclosure for liquid to be frozen in heat transfer relation to the evaporating chamber; a liquid refrigerant supply chamber providing a suction chamber adjacent the top thereof; a conduit connected from adjacent the top of said evaporating chamber to said suction chamber; a rotary valve in said suction chamber controlling said conduit; a second conduit connected from adjacent the bottom of said evaporating chamber to said supply chamber to supply liquefied refrigerant to the evaporating chamber; a second rotary valve operatively connected to said first rotary valve and controlling said second conduit; and a third conduit connected to said second valve to supply hot refrigerant gas to the second conduit.

8. In a freezing machine: a plurality of evaporating chambers; a liquid refrigerant supply chamber providing a suction chamber adjacent the top thereof; a plurality of pairs of conduits connected adjacent the top and bottom respectively of said supply chamber each pair being connected to an evaporating chamber adjacent the top and bottom respectively to serve as suction and liquid refrigerant supply conduits respectively; rotary valve means in said supply chamber controlling said conduits in pairs for progressively simultaneously closing off an evaporating chamber from said supply chamber and suction chamber to trap liquid refrigerant therein; and a hot gas supply conduit connected to said valve means for supplying hot gas to the refrigerant supply conduit of the evaporating chamber thus closed off from the supply chamber.

9. A cyclically operated refrigerator for solidifying a liquid which comprises: a refrigeration chamber having a wall contacted on one side by a body of liquid refrigerant, and on the other side by liquid to be solidified; means for supplying liquefied refrigerant to said chamber; means for applying suction to said chamber to draw off vapor to form a mass of solidified liquid; means for conducting warm gaseous refrigerant into the body of liquefied refrigerant in said chamber at a point adjacent the bottom below the surface of the body of liquefied refrigerant therein to warm said body; and means to close off escape of liquid and gas from said chamber to retain said body of liquid refrigerant in the chamber to allow building up the pressure in said chamber, whereby the heat from the gaseous refrigerant is transmitted to the liquid refrigerant and thaws loose the mass of solidified liquid.

10. A refrigerating machine comprising: a plurality of evaporator chambers; a pair of conduits for each evaporator chamber including a supply conduit connected from a liquid supply source to said evaporator chambers and a suction conduit connected to the evaporator chamber adjacent the top; valve means connected to a source of hot gaseous refrigerant successively controlling said pairs of conduits; and means for operating said valve means timed to substantially simultaneously, close the pair of suction and supply conduits of an evaporator chamber to prevent the escape of liquid and gas from said latter chamber and including means to connect said source of warm, gaseous refrigerant to the latter chamber adjacent the bottom to introduce warm gaseous refrigerant into the refrigerant liquid in said latter chamber at a point below the surface of the liquid refrigerant.

11. A refrigerating machine as specified in claim 10 wherein said liquid supply source comprises a supply chamber having a suction conduit connected to the top thereof, and said suction conduits connected to said evaporator chambers are also connected to said supply chamber adjacent the top thereof.

12. A refrigerating machine as specified in claim 10 wherein said valve means successively connects said source of hot gaseous refrigerant to said respective liquid supply conduits, and said liquid supply conduits are connected adjacent the bottoms to said evaporator chambers.

References Cited in the file of this patent

UNITED STATES PATENTS

| Number | Name | Date |
|---|---|---|
| 1,327,414 | Willcox | Jan. 6, 1920 |
| 1,928,173 | Gerstenberg | Sept. 26, 1933 |
| 2,145,773 | Muffly | Jan. 31, 1939 |
| 2,200,424 | Kubaugh | May 14, 1940 |
| 2,221,212 | Wussow | Nov. 12, 1940 |
| 2,239,234 | Kubaugh | Apr. 22, 1941 |
| 2,247,107 | Waterfill | June 24, 1941 |
| 2,387,899 | Gruner | Oct. 30, 1945 |

(Other references on following page)

UNITED STATES PATENTS

| | | |
|---|---|---|
| 2,403,275 | Gilliam | July 2, 1946 |
| 2,443,203 | Smith | June 15, 1948 |
| 2,444,514 | Kubaugh | July 6, 1948 |
| 2,542,892 | Bayston | Feb. 20, 1951 |
| 2,545,558 | Russell | Mar. 20, 1951 |
| 2,549,747 | Leeson | Apr. 17, 1951 |
| 2,585,240 | Grow | Feb. 12, 1952 |
| 2,590,499 | Braswell | Mar. 25, 1952 |
| 2,595,588 | Lee | May 6, 1952 |

FOREIGN PATENTS

| | | |
|---|---|---|
| 925,476 | France | Sept. 4, 1947 |